Nov. 10, 1953

E. D. THORNE 2,659,001

SELECTIVE ELECTRICAL SWITCHING MEANS FOR COMBINED RADIO AND TELEVISION RECEIVERS

Filed Feb. 28, 1950

3 Sheets-Sheet 1

INVENTOR
EDWIN D. THORNE

BY Richard Van Busum
ATTORNEY

INVENTOR
EDWIN D. THORNE
BY Richard Van Busum
ATTORNEY

Nov. 10, 1953 E. D. THORNE 2,659,001

SELECTIVE ELECTRICAL SWITCHING MEANS FOR COMBINED RADIO AND TELEVISION RECEIVERS

Filed Feb. 28, 1950 3 Sheets-Sheet 3

INVENTOR
EDWIN D. THORNE
BY Richard Van Busum
ATTORNEY

Patented Nov. 10, 1953

2,659,001

UNITED STATES PATENT OFFICE 2,659,001

SELECTIVE ELECTRICAL SWITCHING MEANS FOR COMBINED RADIO AND TELEVISION RECEIVERS

Edwin D. Thorne, Dayton, Ohio

Application February 28, 1950, Serial No. 146,694

6 Claims. (Cl. 250—33)

This invention relates to electrical devices and is more particularly directed to a combined receptacle and rotary selecting switch.

One object of the present invention is the provision of a single unit receptacle for use in the wall or floor of a room, said receptacle comprising all the connections necessary for the proper operation of a combined radio and television receiver.

Another object is to provide in a single unit wall or floor receptacle all of the connections necessary for the proper operation of a combined radio and television receiver, said connections including a selectively operable device for connecting any desired one of several different television antennas to the receiver.

Another object of this invention is to provide in a single unit all of the necessary elements for connecting a combined radio and television receiver to the operating current, for selectively connecting the television portion of said receiver to any desired one of several television antennas, and for connecting a motor unit for rotating the mast upon which said television antennas are mounted, to the operating current.

Still another object is to provide means for connecting the conventional antenna and ground to the radio portion of a combined radio and television receiver, and to provide means for selectively connecting the proper one of several television antennas to the television portion of said receiver.

Other objects and features of this invention will be readily apparent to those skilled in the art, from the specification and appended drawings illustrating certain preferred embodiments in which.

*Description*

Figure 1:
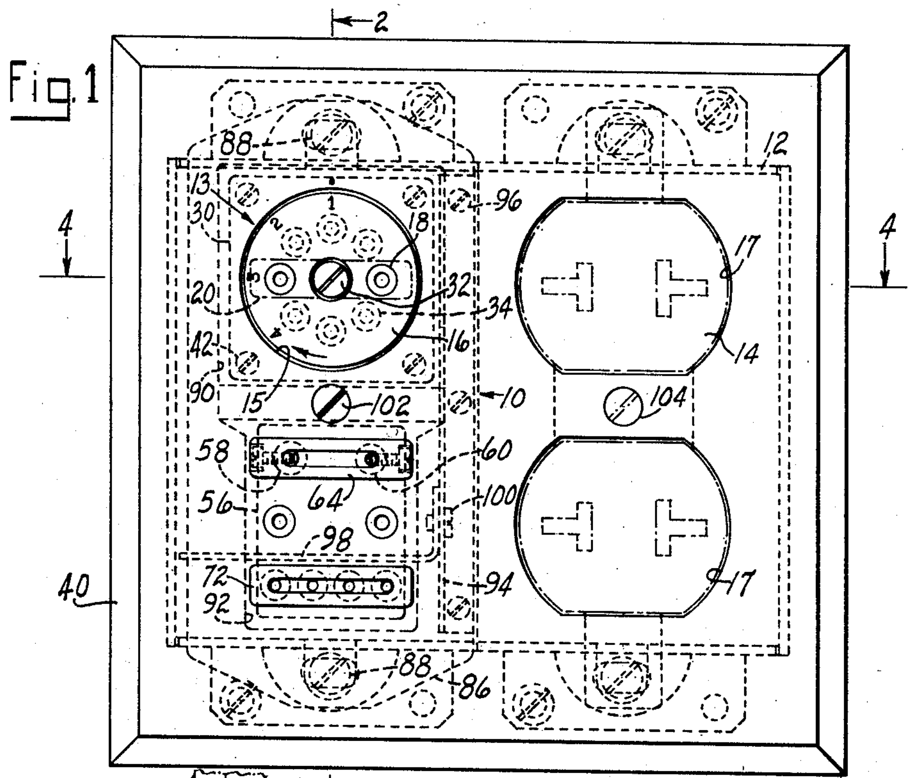
Fig. 1 is a front view in elevation of one form of combined selecting switch and receptacle.

Referring to the drawings, wherein like reference numerals refer to like parts throughout the different figures, the numeral 10 (Figs. 1 to 4) refers generally to the complete unit assembly including a standard duplex 110 volt A. C. receptacle 14, and combination receptacle and rotary switch 13 which are mounted in a standard metal double outlet box 12. The outlet box 12 may be mounted in the base board, wall or floor of a room. The standard duplex receptacle 14 provides an outlet for the A. C. current supply for operating a combined radio and television receiver.

Figures 4, 5, 6, 7, 8:
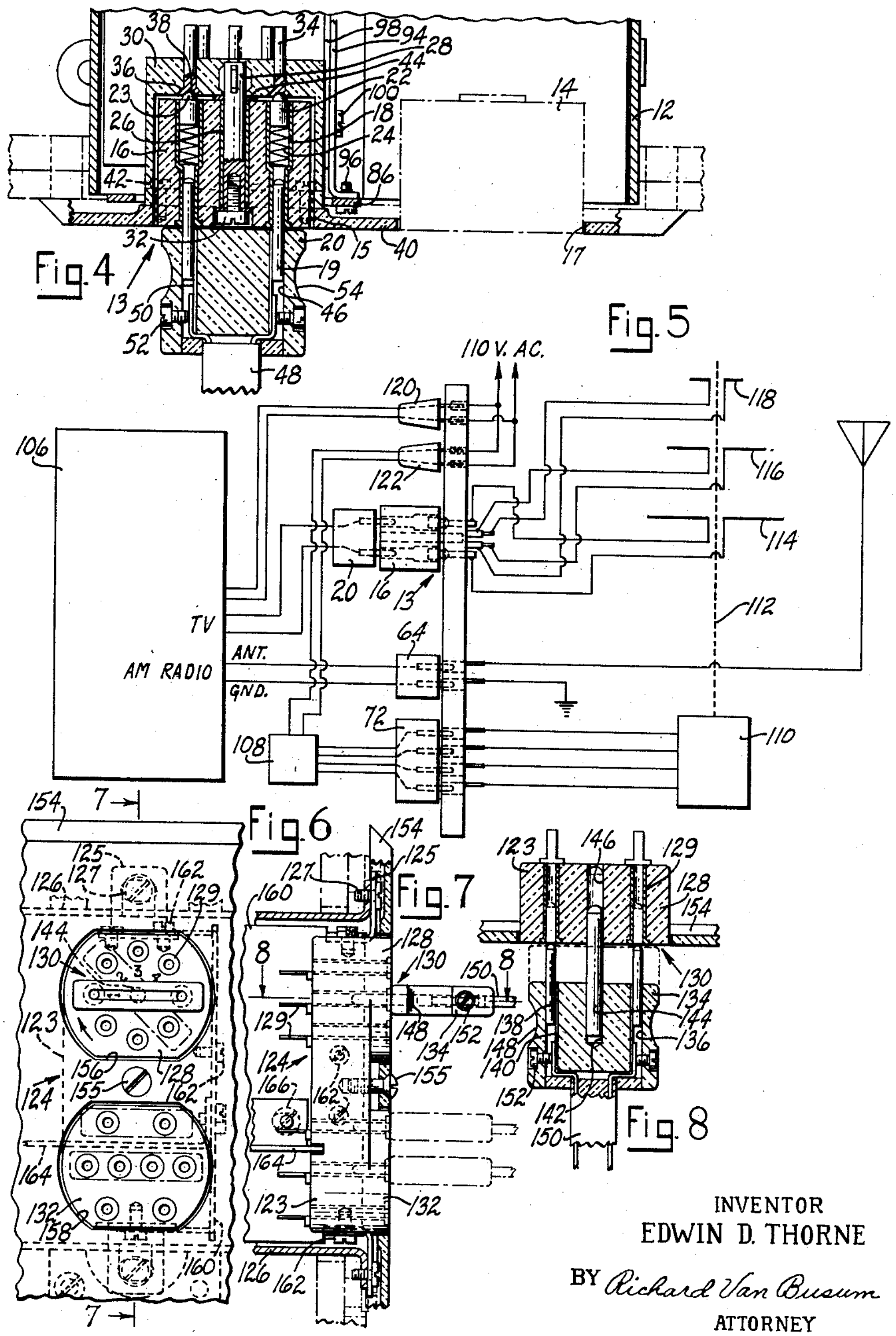
Fig. 4 is a sectional view taken on line 4—4 of Fig. 1.
Fig. 5 is a schematic wiring diagram showing the manner in which the receptacle is used in connection with a combined radio and television receiver.
Fig. 6 is a fragmentary front view of a first modified form of combined selecting switch and receptacle.
Fig. 7 is a sectional view taken on line 7—7 of Fig. 6 looking in the direction indicated by the arrows.
Fig. 8 is a sectional view taken on line 8—8 of Fig. 7.

The combination receptacle and rotary television antenna selecting switch 13 comprises a cylinder 16 which is made of low loss insulating material having integral therewith a pair of sleeve-type contacts 18, the outer ends of which are of a proper diameter to receive pin contacts 19 fast in a connecting plug 20, as shown in Fig. 4, and the inner ends of which are of a larger diameter to freely receive contact plungers 22 and corresponding compression springs 24. A sleeve 26 secured in a central bore in the cylinder 16 is arranged to freely receive a stud 28 which is secured in a cylinder receiving cup 30 made of suitable insulating material. The cylinder 16 fits freely within the cup 30 and is held in place on the stud 28 by a screw 32 threaded into said stud.

There are eight contact pins 34 (Figs. 3 and 4) equally spaced in a circle about the support stud 28 within the cover shell 30. These pins have a head 36 and a recess 38 to receive the rounded ends 23 of the plungers 22. The cylinder 16 is indexed by the plungers 22 under pressure of the springs 24 engaging the recesses 38 in the heads of the contact pins 34. The cup 30 is secured to a face plate 40 by screws 42 (Fig. 1). A washer 44 (Fig. 2) on the stud 28 spaces the bottom of the cylinder 16 from the cup 30.

As shown in Fig. 4, the plug 20 has a pair of holes 46 to receive the pins 19. The type of lead-in wire that is frequently used in television antenna installations is the twin-lead type shown at 48. It is clamped against similar connecting strips 50 by screws 52. Finger notches 54 facilitate removing the plug 20 from switch cylinder 16. The plug 20 is shown inserted in the cylinder 16. One of the advantages of this type of construction is that when the outlet is not in use and the plug 20 is disconnected, the face plate 40 is free from any objectionable projections. The face plate 40 has an opening 15 to accommodate the switch cylinder 16. Openings 17 are provided for the duplex A. C. outlet 14.

There is a molded portion 56 (Figs. 1, 2 and 3) of the plate 40 having secured therein a pair of contact sleeves 58 and 60 of different diameters, each having a friction tab 62. The sleeves 58 and 60 are of different diameters to prevent the reversing of contact pins 66 in a plug 64. The plug 64 is constructed the same as the plug 20 except the spacing and size of the pin contacts 66.

There is a group of four sleeve contacts 68 of equal diameter, also secured in the molded portion 56. The contacts 60 and 68 have bent over tabs 70, which function to secure them in place in the portion 56.

A plug 72 has secured therein a set of four pins 74, which match the sleeve contacts 68, each of said pins having a bore 76, to receive corresponding wire leads 78 of a four wire cable 80, said leads 78 being soldered at 82 in said bores 76.

It is believed to be obvious that any arrangement of the sleeve contacts 60 and 68 may be made in the portion 56 according to the requirements of the installation.

Figures 2, 3:
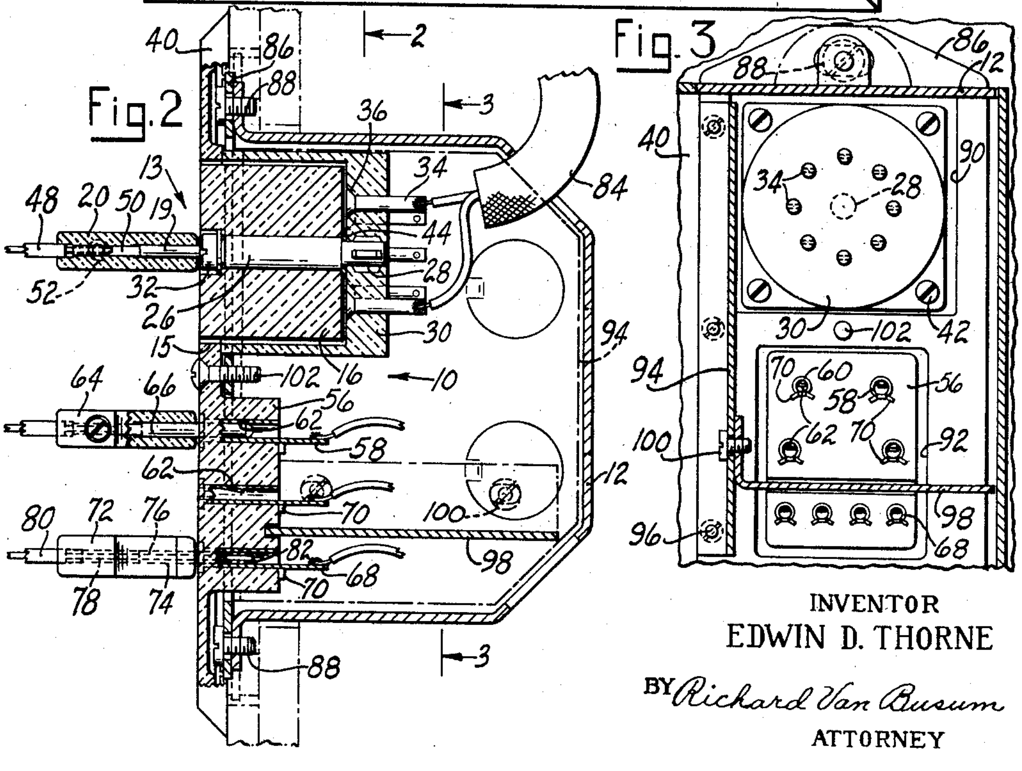
Fig. 2 is a sectional view taken on line 2—2 of Fig. 1 looking in the direction indicated by the arrows.
Fig. 3 is a sectional view taken on line 3—3 of Fig. 2.

The plastic covered twin lead and the four wire cable, which are drawn through suitable holes in the wall of a room, are preferably covered with an insulation such as loom, as shown at 84 (Fig. 2).

A support plate 86 (Figs. 1, 2 and 3) is secured to the outlet box 12 by screws 88, and has openings 90 and 92 to provide clearance for the television switch cup 30 and the outlet portion 56 respectively.

Means is provided to isolate the radio and television switch outlet from the A. C. compartment and comprises a shield or baffle plate 94 which is secured to the support plate 86 by screws 96. The contacts 68 which carry 24 volt A. C. current may be isolated from the radio and television outlet by a baffle plate 98 which is secured to the plate 94 by screws 100.

The face plate 40 is secured to the support plate 86 and the duplex outlet 14 by means of screws 102 and 104.

One of the circuit arrangements for which the combination receptacle and rotary antenna selecting switch may be used is shown in the diagrammatic view Fig. 5. The radio and television receivers is represented by the reference number 106. A step down transformer and a direction control device with indicator are represented by reference number 108. The 24 volt A. C. current which is supplied by the unit 108 operates a reversible motor 110 for rotating a television antenna mast 112.

There are three television antennas 114, 116 and 118 of different characteristics which are constructed for different frequencies, mounted on the mast 112. These three antennas are selected for connection to the receiver by rotating the television selecting switch 13 (Figs. 1 and 4).

The plug 64 is used for connecting the conventional antenna and ground to the standard radio section of the receiver.

A plug 120 connects the 110 volt A. C. to the receiver 106, and a plug 122 connects the 110 volt A. C. to the control unit 108.

A first modified form of combination receptacle and selecting switch 124 is shown in Figs. 6, 7 and 8.

The combination receptacle and selecting switch 124 comprises a main body 123 which is made of low loss insulating material molded into one unit and mounted in a standard double outlet box 126 by brackets 125 and secured by screws 127. As shown in Fig. 6, the outlet 124 has an upper portion 128 containing a selecting switch 130 and a lower portion 132, having outlets for standard radio antenna and ground, an outlet for 24 volt A. C. and outlets for four television antennas.

The selecting switch 130 consists of a molded portion 128, having eight sleeve contacts 129 equally spaced in a circle about a central bore 146. The bore 146 rotatably receives a guide pin 144 fast in a hole 142 in a rotary plug 134.

The plug 134 has a pair of holes 136 in which are secured contact pins 138 and connecting strips 140. The centering and guide pin 144 is longer than the pins 138. Finger grip notches are shown at 148. The twin lead 150 is secured in the plug 134 by screws 152.

With reference to Fig. 8, the plug 134 is shown with the contact pins 138 disengaged from the sleeve contacts 129, but with the guide pin 144 remaining in bore 146. This enables the plug 134 to be turned to another selecting position and pressed into engagement with the selected pair of sleeves 129, as shown here in dotted lines.

A cover plate 154 is provided to cover the standard double outlet box 126, and said plate has a pair of openings 156 and 158, which accommodate the portions 128 and 132. The face plate 154 is secured to the outlet 124 by screw 155.

The double outlet box 126 also has mounted therein standard duplex 110 volt A. C. outlets, not shown, but similar in every respect to outlets 14 shown in Fig. 1.

The isolation of the outlet 124 from the A. C. voltage outlet is accomplished by a shield or baffle plate 160, which is secured to the portion 123 by the screws 162. When the 24 volt A. C. current is used in the outlet 124, it is isolated by a plate 164 which is secured to the plate 160 by screws 166.

For the purpose of illustration the invention is shown as a combination receptacle and rotary selecting switch for radio and television antenna installations, but the rotary selecting switch is not limited to this use but may be used where it is desired to select any two wire circuit from a group of circuits.

Figures 9, 10:
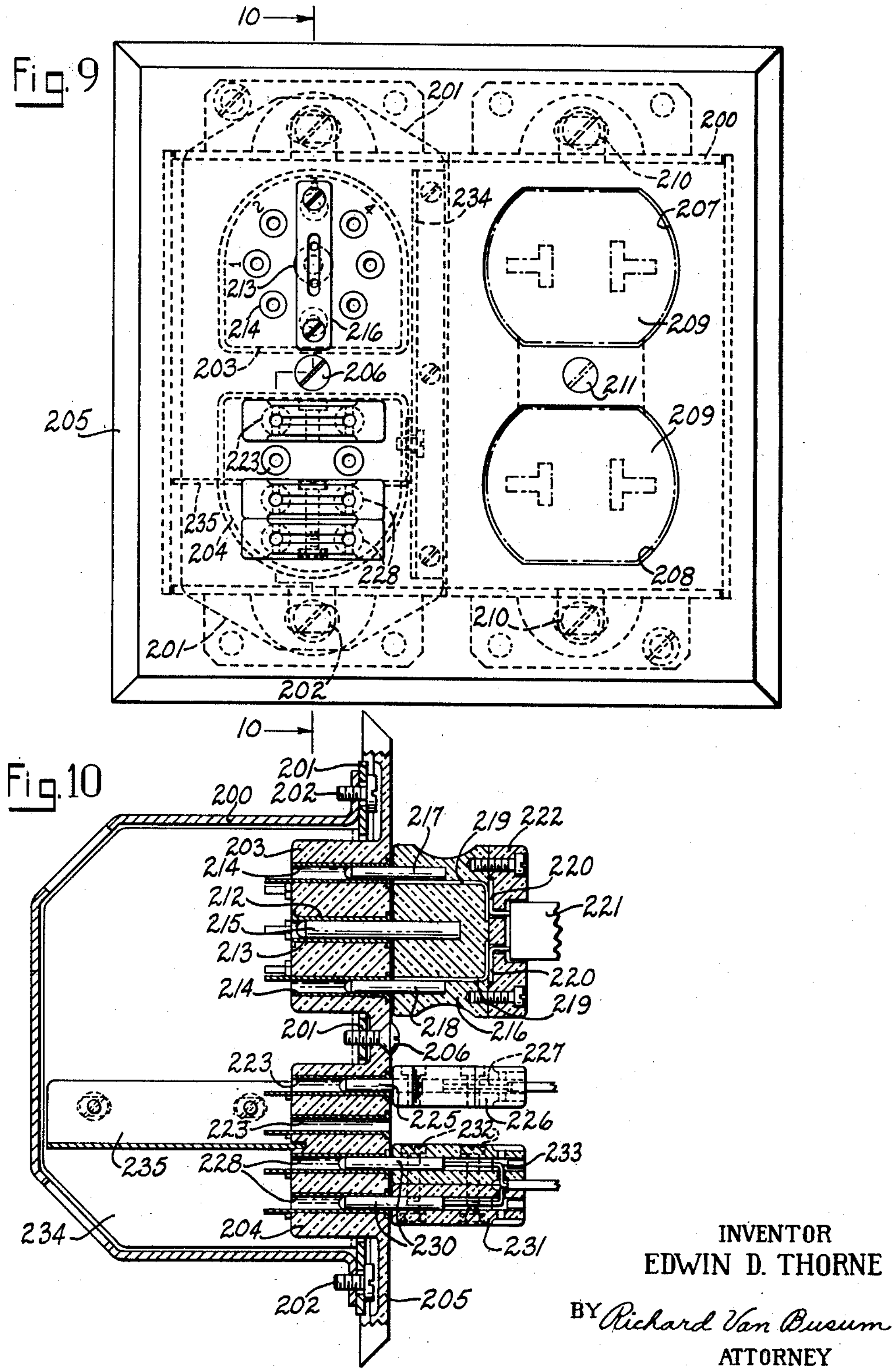
Fig. 9 is a front plan view of a second modified form of combined selecting switch and receptacle.
Fig. 10 is a sectional view taken along line 10—10 of Fig. 9 looking in the direction indicated by the arrows.

Figs. 9 and 10 illustrate a modification of the combination selecting switch and duplex outlet shown in Figs. 6, 7 and 8.

The modification includes a double outlet box 200 of standard construction suitably attached to the wall or floor of the room in which it is to be used. A metal support bar 201 is secured to the box 200 by screws 202, said bar having D-shaped clearance openings therein to receive similarly shaped inwardly disposed extensions 203 and 204 integral with a top cover plate 205 secured to the bar 201 by a screw 206. The plate 205 and extensions 203 and 204 are molded of suitable plastic insulating material.

The cover plate 205 (Fig. 9) also has two similar openings 207 and 208 to accommodate duplex A. C. outlet 209 of standard construction, said outlet being secured to the box 200 by screws 210.

The plate 205 is further held in place by a screw 211 threaded into the outlet 209.

The extension 203 has a central bore 212 with a bushing 213 secured therein. Equally spaced in a circle about the central bore 212 is a plurality of holes having therein metal sleeve contacts 214 with terminal lugs for corresponding terminal wires.

The sleeve contacts 214 are arranged in diametrically opposed related pairs numbered 1, 2, 3 and 4, these related pairs being connected to corresponding antennas of different characteristics for a combined radio and television receiver.

The bushing 213 freely receives an axle 215 made of metal and secured in a rectangular-shaped plug 216, made of suitable insulating material. Also secured in the plug 216 in concentric relationship to the axle 215 are contact pins 217 and 218 arranged to engage the related contact sleeves 214 as the plug is rotated about the axle 215.

The pins 217 are connected by L-shaped metal strips 219 to terminals 220 encased in a suitable dielectric cable 221, said terminals leading to the combined television and radio receiver.

The terminals 220 are maintained in electrical contact with the L-shaped strips 219 by a cap 222 which is secured to the plug 216 by suitable screws.

The switch comprising the plug 216 and the related sleeve contacts 214, is similar in every respect to and operates exactly like the switch shown in Figs. 6, 7 and 8, and explained earlier herein.

In use the plug 216 is pulled outwardly until the contact pins 217 and 218 are free of the sleeves 214, then said plug is rotated until said pins are opposite the desired or selected pair of related sleeves, after which said plug is pushed inwardly to connect the selected antenna to the television receiver.

The extension 204 of the plate 205 has four sleeve contact openings 223 therein adapted to receive contact pins 225 secured in a plug member 226, said contact pins being connected by terminals 227 to the conventional antenna and ground connections of the radio portion of the combined television and radio set. The sleeves 223 have inwardly extending terminal lugs thereon on which are connected by suitable terminals to the conventional antenna and ground for the radio portion of the receiver.

The extension 204 also has four sleeve contacts 228 therein arranged to receive pin contacts 230 secured in two plugs 231, said plugs being similar in every respect to the plug 226; however, in this case they are secured together by screws 232 to form a single plug member having four contact pins. The contact pins 230 are connected by corresponding terminals 233 to the transformer 108 (Fig. 5), which is in turn in electrical connection with the 110 volt A. C. supply. The contact sleeves 228 have inwardly extending terminal lugs which are in turn connected to corresponding terminals leading to the rotating motor 110 for the television antenna mast 112, as shown in Fig. 5.

As previously explained the switch mechanism shown in Figs. 9 and 10 function in substantially the same manner as the switch mechanism shown in Figs. 6, 7 and 8, and it is believed that further description of the operation of this switch mechanism is unnecessary.

A shield or baffle plate 234 (Figs. 9 and 10) secured to the bar 201 is provided for isolating the selecting switch mechanism and the other radio connections of the device from the A. C. outlet portion of said device. The baffle 234 extends inwardly, as shown in Fig. 10 and conforms generally in outline to the interior shape of the outlet box 200.

A cross baffle 235, extending in front of the sleeve contacts 228 and secured to the main baffle 234, isolates the A. C. connections for the antenna rotating motor from the remainder of the radio and television connections.

Obviously many other variations within the scope of the invention will occur to those skilled in the art, therefore it is not intended to limit the invention to the exact forms shown and described herein.

What is claimed is:

1. A combined electrical receptacle and selecting switch comprising in combination a main supporting plate made of insulating material and having a plurality of openings therein; a cup-shaped member made of insulating material and secured to the plate in register with one of the openings therein; an axle secured in the center of the cup-shaped member; a plurality of stationary pin contacts mounted in the member in a circle about the axle, diametrically opposed pairs of said contacts being connected to a particular apparatus; a cylinder made of insulating material and arranged to fit freely within the cup-shaped member and having a central bore which freely engages the axle to form a rotatable bearing for said cylinder; a pair of sleeve contacts extending through the cylinder; a contact plunger having one end rounded and freely supported in one end of each sleeve; a spring freely mounted in said one end of each sleeve and functioning to yieldingly urge the rounded ends of the plungers into engagement with the selected pairs of pin contacts in the member as the cylinder is rotated; and a plug having two push-pin contacts connected to a demand source and arranged to be engaged with the other ends of the sleeves to form a connection between said push-pins and the selected pair of pins in the member to connect the desired apparatus to the demand source, said plug also providing means for rotating the cylinder to select the desired apparatus.

2. A claim according to claim 1 in which each diametrically opposed pair of stationary pins are connected to a television antenna having certain characteristics, said antennas being mounted on a rotatable mast and in which the push-pin contacts are connected to a combined radio and television receiver.

3. A claim according to claim 1 in which a standard duplex electrical outlet is mounted opposite corresponding openings in the main supporting plate.

4. A claim according to claim 2 in which a plurality of fixed sleeve contacts are mounted in the main supporting plate, certain of said contacts being connected to a motor for rotating the mast to tune the antennas, and other of said contacts being connected to an antenna and a ground for the radio portion of the receiver, a plug member having a plurality of pin contacts engageable with the sleeve contacts for the motor, said pins being connected to a supply source of electricity, and a plug member having pin contacts engageable with the sleeve contacts for the antenna and ground for the radio portion of the receiver, said contacts being connected to the receiver.

5. A claim according to claim 1 in which the pair of sleeve contacts in the cylinder are of one diameter throughout one-half their length and of another diameter throughout the other half of their length, the larger diameter freely supporting the corresponding contact-plungers and their springs and the smaller diameter arranged to be engaged by the push-pin contacts.

6. A combined electrical receptacle and selecting switch comprising in combination a main supporting plate made of insulating materials and having a plurality of openings therein; a cup-shaped member made of insulating material and secured to the plate in register with one of the openings therein; an axle secured in the center of the cup-shaped member; a plurality of stationary contacts mounted in the member in a circle about the axle, diametrically opposed pairs of said contacts being connected to a particular apparatus; a cylinder made of insulating material and arranged to fit freely within the cup-shaped member and having a central bore which freely engages the axle to form a rotatable bearing for said cylinder; a pair of diametrically opposed sleeves extending through the cylinder; a yieldable contact element mounted in the inner end of each sleeve and constructed and arranged to yieldingly engage the corresponding one of the selected pairs of stationary contacts as the cylinder is rotated; and a connector plug having a pair of diametrically opposed pin contacts connected to a suitable demand source and engageable with the outer ends of the sleeves to form a connection between said pins and the selected pair of stationary contacts in the member to connect the desired apparatus to said demand source, said connector plug also serving as a means for rotating the cylinder to select the various apparatuses.

EDWIN D. THORNE.

References Cited in the file of this patent

UNITED STATES PATENTS

| Number | Name | Date |
|---|---|---|
| 810,949 | Kloman | Jan. 30, 1906 |
| 1,756,931 | Anderson | May 6, 1930 |
| 1,800,259 | Mayrshofer | Apr. 14, 1931 |
| 2,002,177 | Hastings | May 21, 1935 |
| 2,201,881 | Bryant et al. | May 21, 1940 |
| 2,272,431 | Rankin | Feb. 10, 1942 |
| 2,331,534 | Bluemle et al. | Oct. 12, 1943 |
| 2,344,780 | Kram et al. | Mar. 21, 1944 |
| 2,432,476 | Hesse | Dec. 9, 1947 |
| 2,454,221 | Seals | Nov. 16, 1948 |
| 2,512,682 | Salinger et al. | June 27, 1950 |
| 2,538,497 | Bass | Jan. 16, 1951 |
| 2,545,681 | Zepp et al. | Mar. 20, 1951 |

FOREIGN PATENTS

| Number | Country | Date |
|---|---|---|
| 486,012 | Germany | Nov. 13, 1929 |
| 662,204 | France | Mar. 18, 1929 |